United States Patent [19]

Harbers, Jr.

[11] Patent Number: 5,144,116
[45] Date of Patent: Sep. 1, 1992

[54] APPARATUS FOR PROCESSING A CARD HAVING DISPLACEABLE BUBBLES THEREON

[75] Inventor: Henry C. Harbers, Jr., Templeton, Calif.

[73] Assignee: Escorp, Inc., San Luis, Calif.

[21] Appl. No.: 592,992

[22] Filed: Oct. 5, 1990

[51] Int. Cl.⁵ .............................................. G06K 7/04
[52] U.S. Cl. .................................... 235/444; 235/453
[58] Field of Search ............ 235/487, 448, 475, 61.11, 235/444; 434/327, 346; 346/91, 136

[56] References Cited

U.S. PATENT DOCUMENTS

| | | |
|---|---|---|
| 2,453,239 | 11/1948 | Luhn . |
| 2,507,307 | 5/1950 | Josephy . |
| 2,746,679 | 5/1956 | Stratton et al. . |
| 3,095,502 | 6/1963 | Sikora . |
| 3,441,714 | 4/1969 | Simjian . |
| 3,510,848 | 5/1970 | Becker et al. . |
| 3,634,853 | 1/1972 | Hedges . |
| 3,637,989 | 1/1972 | Howard et al. . |
| 3,686,480 | 8/1972 | Bowerman . |
| 3,688,087 | 8/1972 | Howard et al. . |
| 3,714,398 | 1/1973 | Brock ............................ 235/61.11 |
| 3,737,631 | 6/1973 | Harris . |
| 3,854,035 | 12/1974 | Tyler et al. . |
| 3,868,652 | 2/1975 | Cooper et al. . |
| 3,916,159 | 10/1975 | del Castillo . |
| 3,934,242 | 1/1976 | Mueller . |
| 3,937,453 | 2/1976 | Hickey et al. . |
| 3,937,929 | 2/1976 | Knauer . |
| 3,986,030 | 10/1976 | Teltscher . |
| 4,128,757 | 12/1978 | Garner, Jr. . |
| 4,180,204 | 12/1979 | Koenig et al. . |
| 4,215,813 | 8/1980 | Hill et al. ............................ 235/448 |
| 4,310,897 | 1/1982 | Lazzari . |
| 4,313,108 | 1/1982 | Yoshida . |
| 4,363,584 | 12/1982 | Kokubo . |
| 4,369,361 | 1/1983 | Swartz et al. . |
| 4,467,321 | 8/1984 | Volnak . |
| 4,516,016 | 5/1985 | Kodron . |
| 4,664,418 | 5/1987 | Bear . |
| 4,808,805 | 2/1989 | Harbers . |
| 4,812,630 | 3/1989 | Harbers, Jr. . |
| 4,889,981 | 12/1989 | Harbers, Jr. . |

FOREIGN PATENT DOCUMENTS

| | | |
|---|---|---|
| 759591 | 11/1970 | Belgium . |
| 750179 | 5/1944 | Fed. Rep. of Germany . |
| 2046040 | 3/1972 | Fed. Rep. of Germany . |
| 2234935 | 1/1974 | Fed. Rep. of Germany . |
| 0015786 | 1/1985 | Japan ................................. 235/487 |

OTHER PUBLICATIONS

Harmon, Reading Between the Lines Jan. 1989, p. 137.

Primary Examiner—Stuart S. Levy
Assistant Examiner—Richard M. Weinberg
Attorney, Agent, or Firm—William W. Haefliger

[57] ABSTRACT

Apparatus for processing a menu device comprising a card; bubbles on the card having positions corresponding to selectable data; each bubble having a first position projecting upwardly from the plane of the card, and a second position into which it is displaced relative to the plane of the card, by finger pressure, to indicate selection of data corresponding to bubble position on the card, the apparatus comprising first structure for detecting which of the bubbles are so displaced, and; second structure to engage displaced bubbles and to urge them back toward the first positions after the first structure detects which of the bubbles are displaced to second positions.

16 Claims, 9 Drawing Sheets

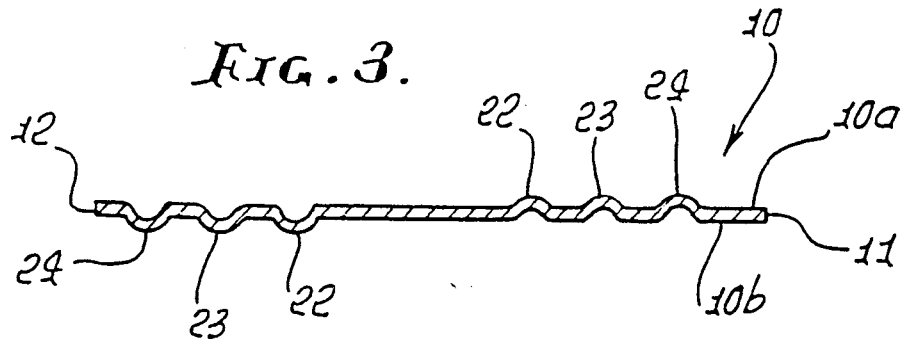
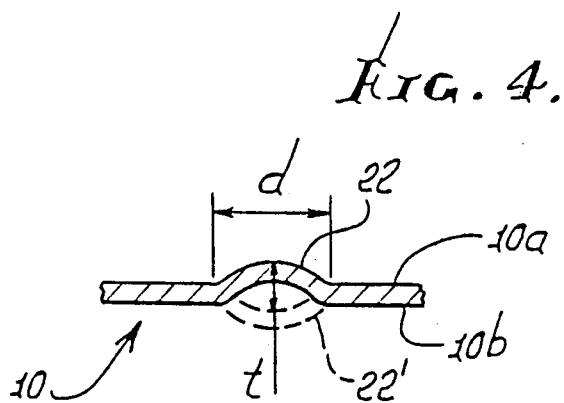
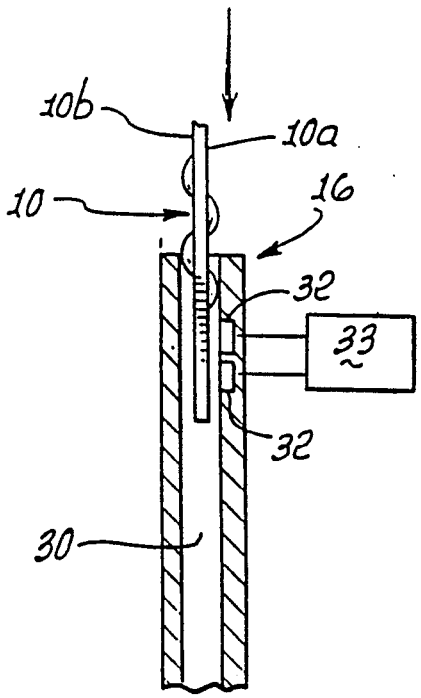
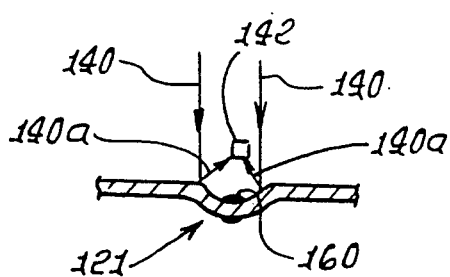
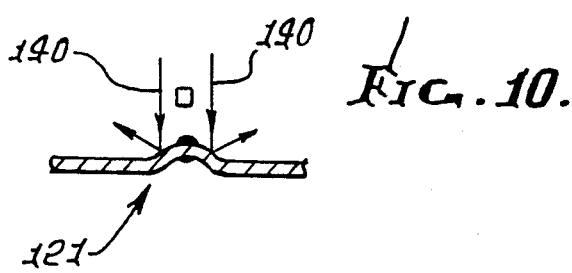

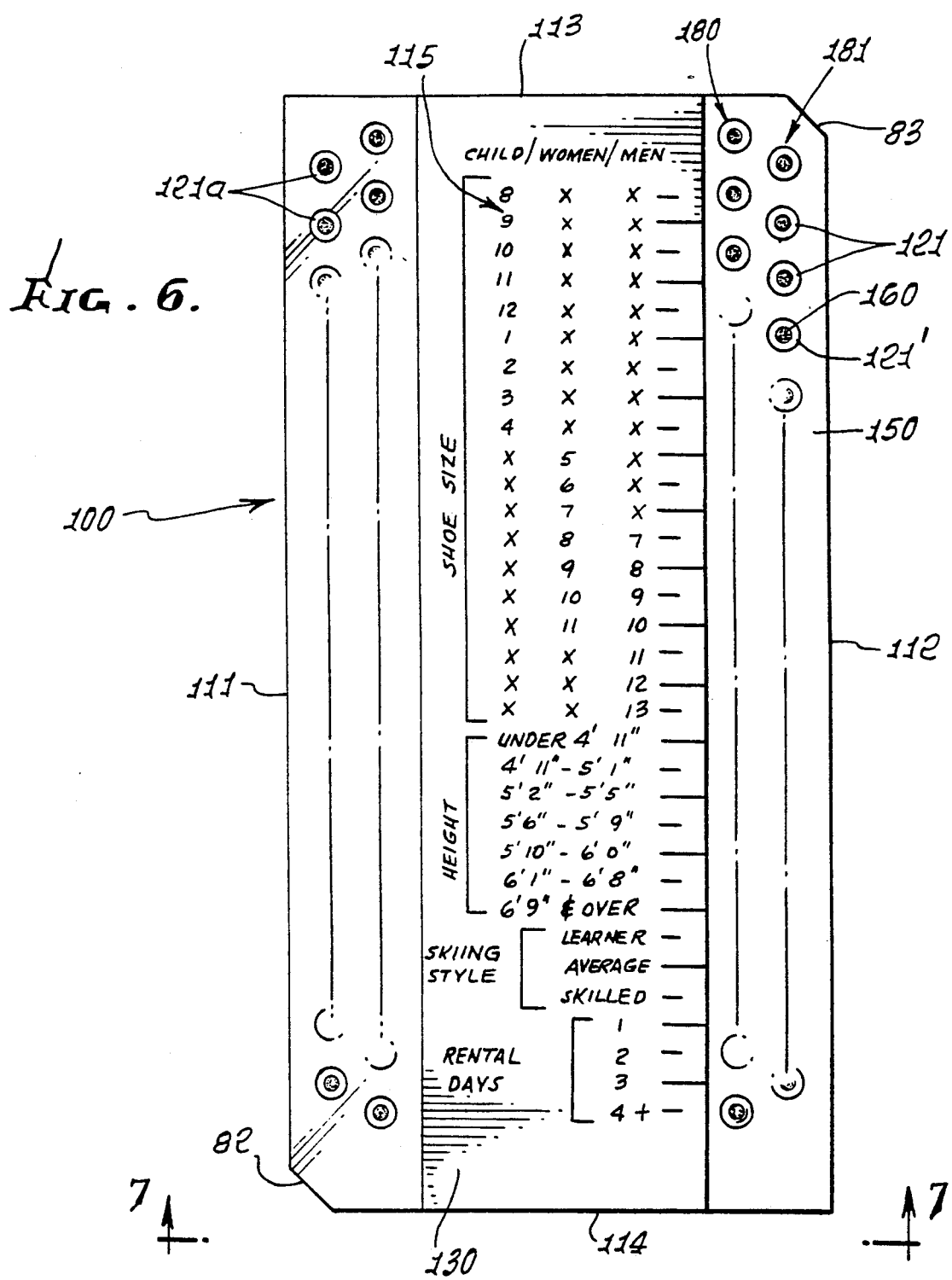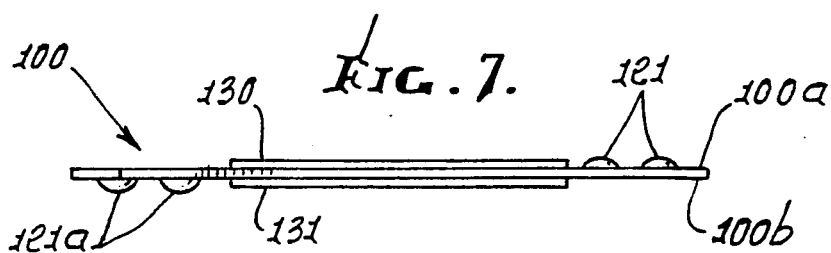

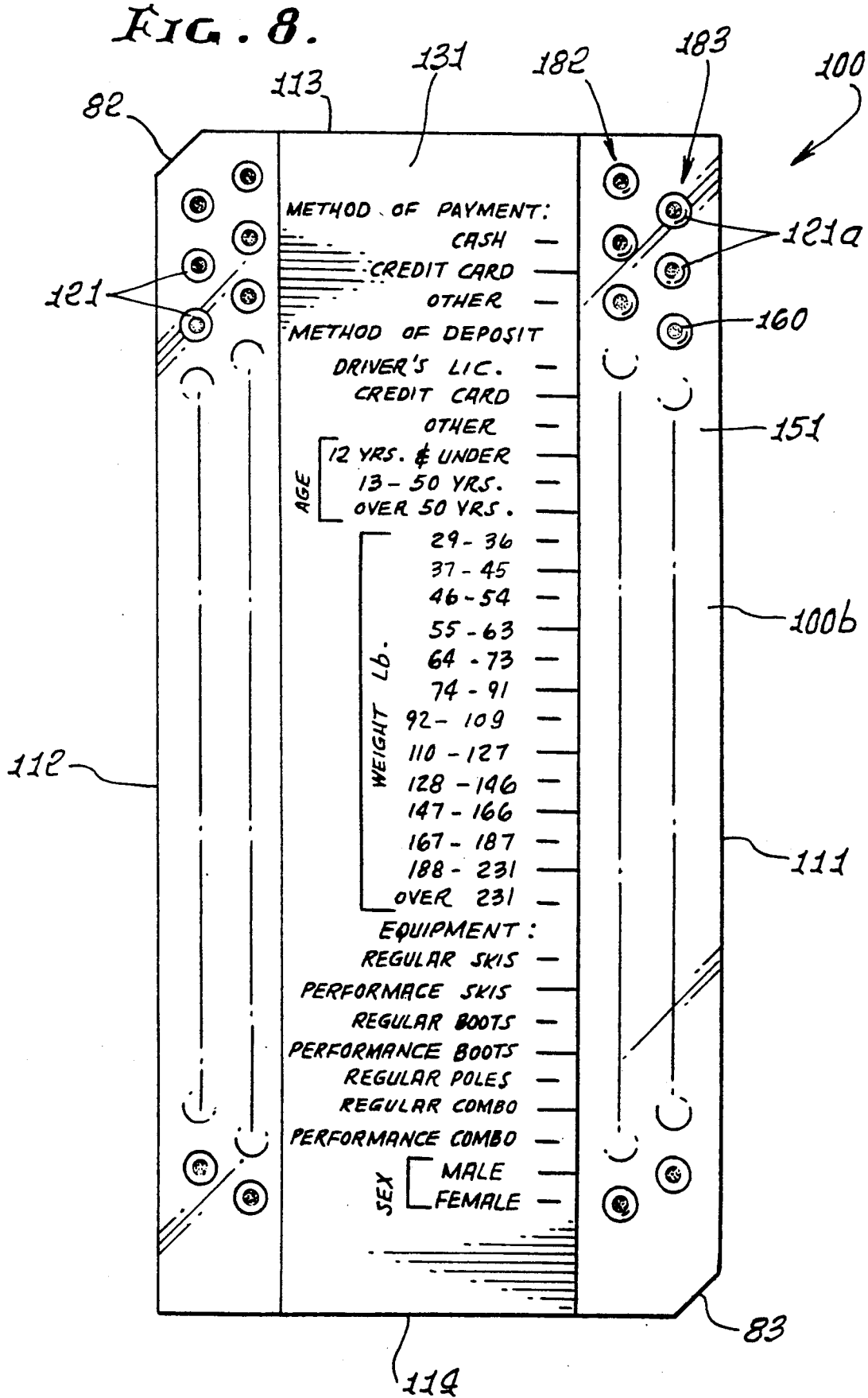

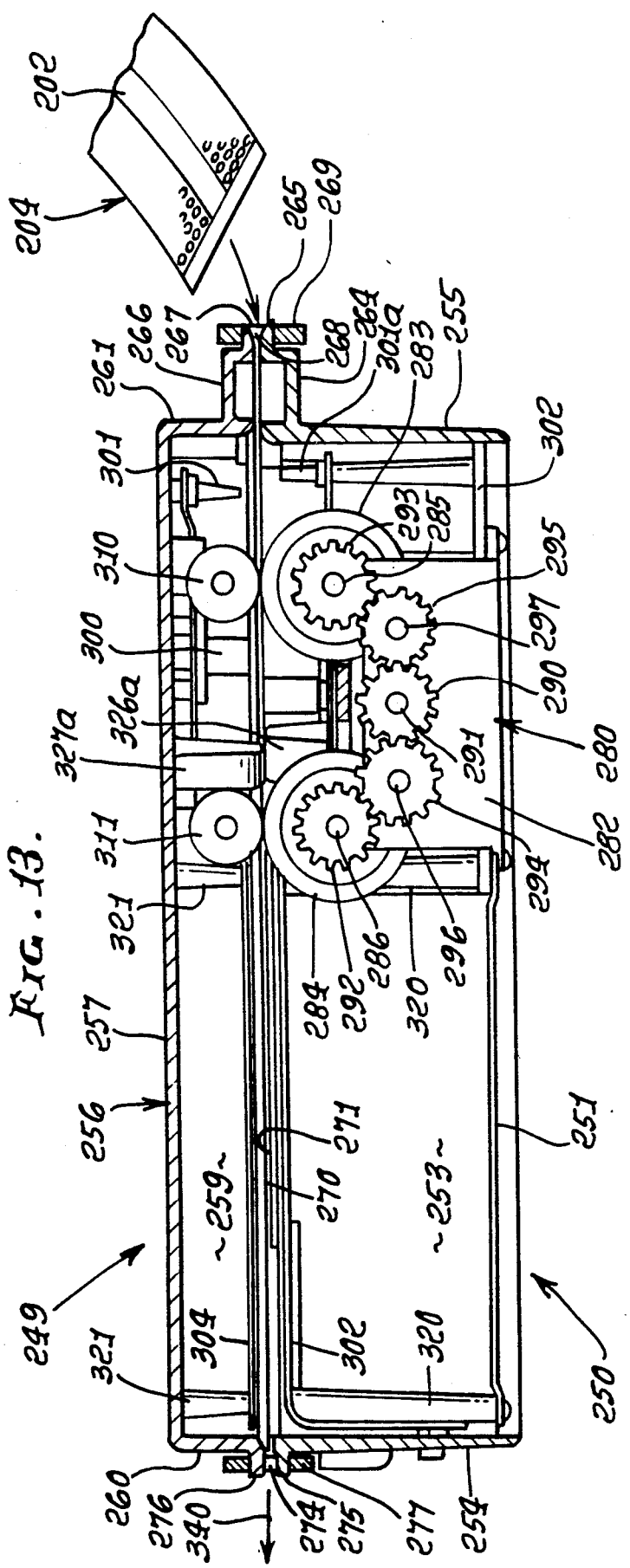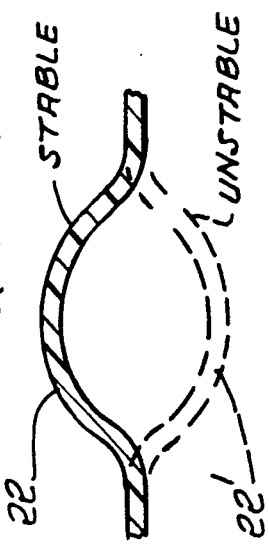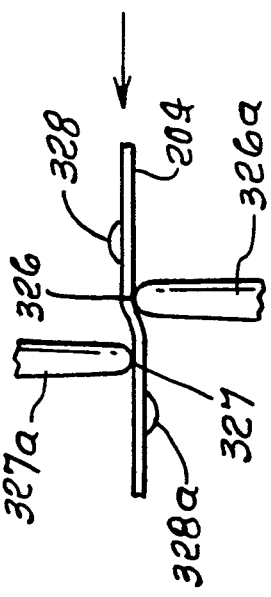

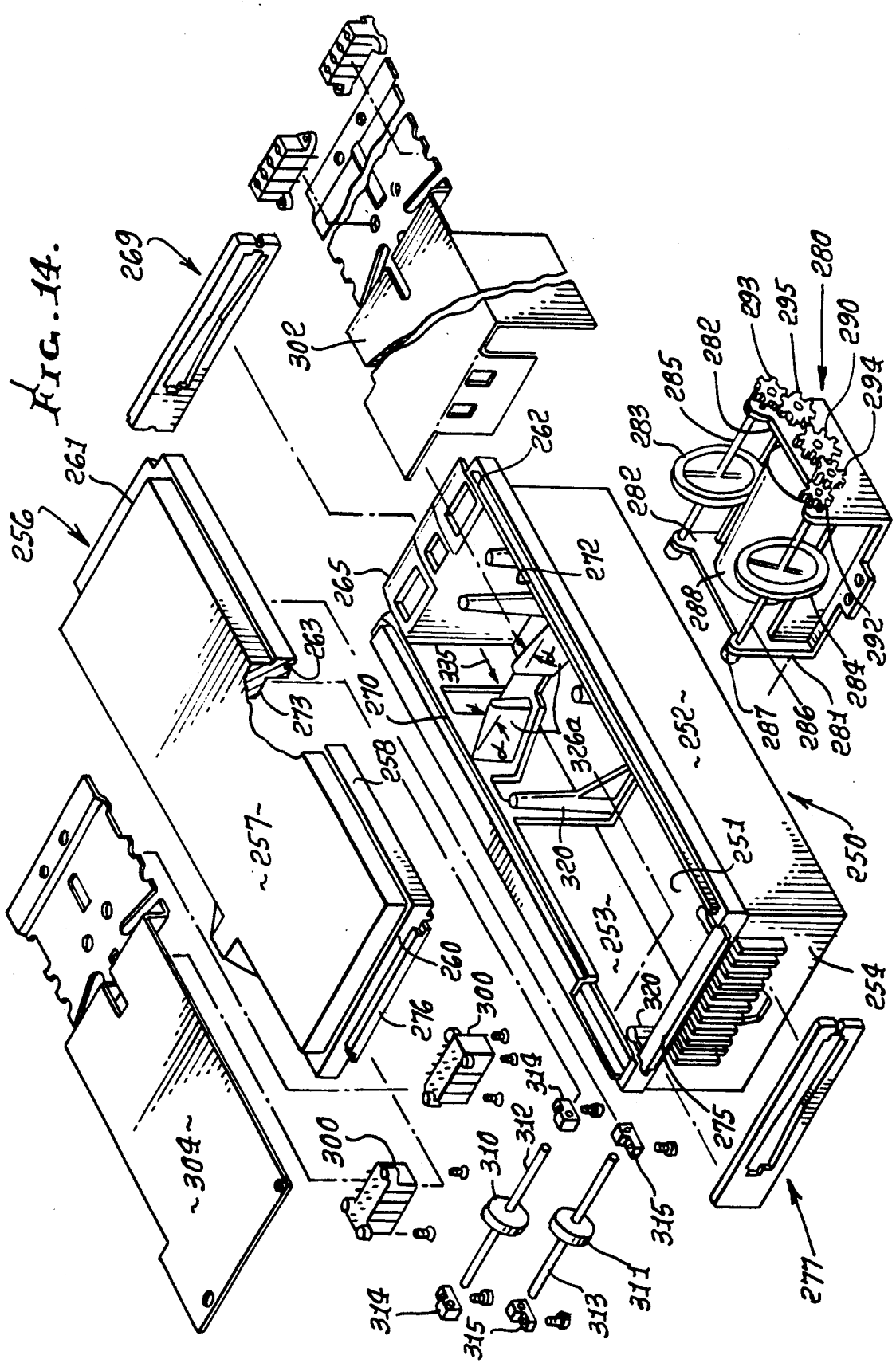

APPARATUS FOR PROCESSING A CARD HAVING DISPLACEABLE BUBBLES THEREON

BACKGROUND OF THE INVENTION

This invention relates generally to the selecting and filling of orders, and more particularly to use of a very simple, reusable card on which orders can be entered via displacement of bubbles or the like on the card, and operation of a reading apparatus or to sense bubble displacement and to urge displaced bubbles toward undisplaced positions.

There is need, as for example at fast food take-out establishments, or other order-receiving establishments, for means to enable rapid conversion of desired orders into groupings ready to be taken out or shipped. A major problem is the time required for the order giver to think through and remember what he desired, as he attempts to quickly convey this information to a clerk. Order changes are frequent as the order given attempts to state items and/or number of items to the clerk while he re-thinks his desires and the desires of others accompanying him or her at the establishment. There is a great deal of time wasted, and the order filling process is slowed to the inconvenience of those waiting in line to have their orders filled. There is need for means or system that obviates these and similar problems, including the need for a quickly programmable and reprogrammable menu device. Certain of such devices employing bubbles on cards are disclosed in U.S. Pat. Nos. 4,889,981, 4,808,805, and 4,812,630.

There is also need for apparatus or means to quickly "read" and "de-bubble" such cards having displaceable bubbles, and in particular flexible cards which become warped when selected bubbles are displaced, as for example manually. After such debubbling, the cards may be reused, i.e., reprogrammed for further use. Such cards may be general information bearing cards, and need not be restricted to fast-food, take-out menu cards. Also, there is need to store and read non-changeable, readable information on such cards.

SUMMARY OF THE INVENTION

It is, accordingly, a major object of the invention to provide a highly effective, simple, reliable apparatus capable of "reading" or sensing displaced bubbles on such cards, and for urging displaced bubbles back toward undisplaced condition, to enable card reuse.

It is another object of the invention to provide apparatus of the character referred to wherein the card to be processed is de-warped in response to card flexing bubble displacement.

These objects are met by provision of:
a) first means for detecting which of the bubbles are so displaced, and
b) second means to engage displaced bubbles and to urge them back toward their initial positions after the first means detects which of the bubbles are displaced to second positions.

Typically, the card itself may carry indicia listing items to be selected; and bubbles on the card corresponding to the indicia, and having positions representative of numbers of items to be selected; each bubble having a "stable" first position projecting upwardly from the plane of the card, and a second "unstable" position into which it is displaced relative to the plane of the card, by finger pressure, to indicate selection of a number of the items corresponding to bubble position on the card. Alternatively, the card may carry non-bubble indicators movable between such positions, and also fixed indicators, or openings, or BAR code on the card, readable by such apparatus. A ROM/RAM-type mechanical memory device is thereby provided.

Another object is to provide drive means associated with card-receiving apparatus to displace the card in a de-bubbling zone or zones. Such drive means may be rotatable forwardly, or forwardly and reversely, in engagement with the card, as will be seen; and de-bubbling surfaces may be operatively associated with the drive means.

Another object is provide a method of processing such a card, the method including:
a) providing apparatus for receiving the card and for detecting and engaging displaced bubbles,
b) operating the apparatus to detect which of the bubbles are so displaced, and
c) operating the apparatus to engage displaced bubbles to urge them back toward initial positions after detecting which of the bubbles are displaced to second positions.

The step of causing unstable state bubbles to return to stable state may advantageously include flexing the card at the unstable state bubble locations, and such "de-bubbling" may be carried out progressively or sequentially.

Yet another object is to effect such debubbling before the bubbles, on a thin plastic card, become "set" in unstable state.

A further step includes driving the card between deflecting surfaces acting to flex the card sufficiently to "de-bubble" same. In this regard, card de-bubbling may be carried out at the same location as card reading, or the two may be carried out at different locations.

These and other objects and advantages of the invention, as well as the details of an illustrative embodiment, will be more fully understood from the following specification and drawings, in which:

DRAWING DESCRIPTION

FIG. 3 is a section taken on lines 3—3 of FIG. 1;

FIG. 4 is an enlarged section showing bubble construction and multiple positions;

FIG. 5 is a vertical section showing bubble sensor means;

FIG. 6 is a plan view of a modified card;

FIG. 7 is an edge view on lines 7—7 of FIG. 6;

FIG. 8 is a plan view of the back side of the FIG. 6 card;

FIGS. 9 and 10 show bubble reading;

FIG. 13 is a side elevation taken in section through card reading and de-bubbling apparatus;

FIG. 14 is an exploded perspective view of the FIG. 13 apparatus;

FIG. 15 is an enlarged vertical elevation showing card flexing and de-bubbling; and FIG. 16 is like FIG. 4 and shows bubble states on a thin warping card.

DETAILED DESCRIPTION
GENERAL DISCUSSION

Figure 11:
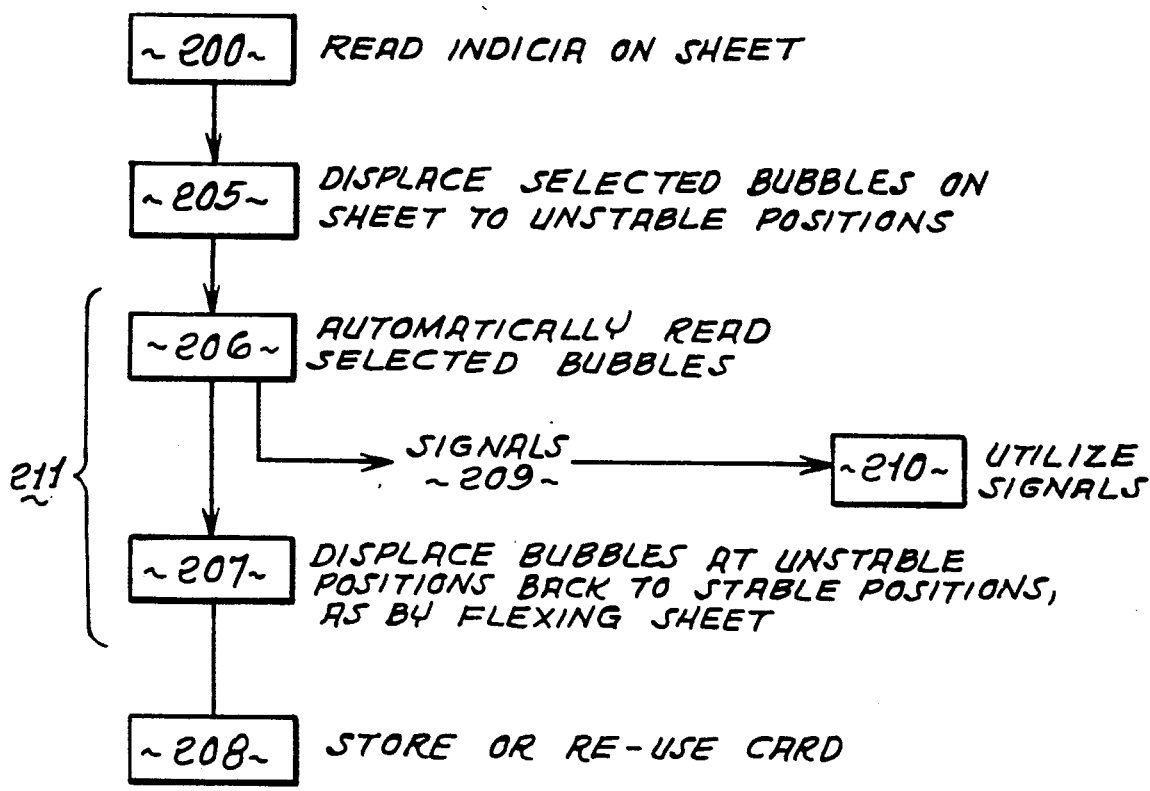
FIGS. 11 and 12 are functional blocking diagrams.
Figure 11A:
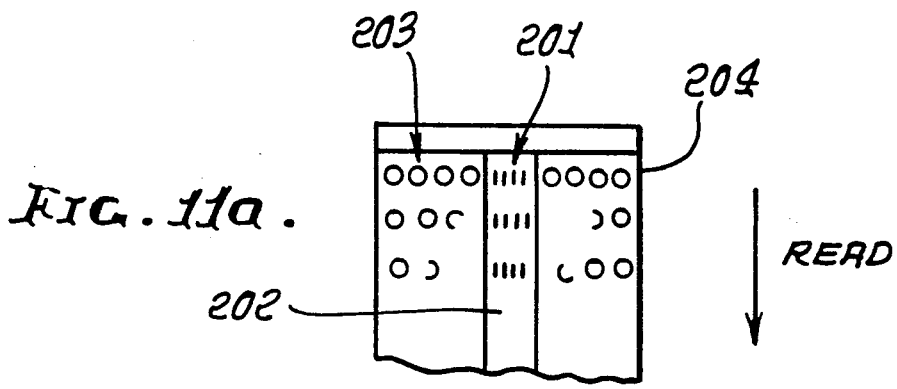
FIGS. 11a and 12a show portions of cards.

Referring first to FIG. 11, showing in functional block form one way in which the invention may be realized, block 200 indicates the initial step of reading indicia on a sheet or card. Such reading may be visual, the indicia to be read for example being generally indicated at 201 on central zone 202 of a card 204, seen in FIG. 1a. They may be any form of written material, for example, that corresponds to bubbles on a card to be selected. See for example rows of bubbles 203 on the plastic card 204 in lateral alignment with rows of the indicia. See also the later discussion of FIGS. 1-8, and also as disclosed in U.S. Pat. Nos. 4,808,805; 4,812,630; and 4,889,981, all incorporated by reference herein.

Referring back to FIG. 11, block 205 represents or indicates the step of displacing selected bubbles 203 on the card or sheet 204 from stable to unstable positions. See in this regard FIG. 4 herein. Such selected bubbles correspond to the visual selection of the corresponding indicia at 201. Such bubble displacement is typically manual, and in the case of a thin plastic card will or may result in warping of the card due to stress creation at the displaced bubble locations.

Blocks 206 and 207 are more directly related to the present invention, and are therefore grouped by reference under the collective numeral 211, as shown. Block 206 indicates the automatic reading or sensing of the selected, i.e, displaced bubbles, on the card. Such sensing may be by means of a sensor to be described. See also FIGS. 5 and 9 herein, and FIGS. 13-15 all to be described. Block 207 indicates the subsequent step of displacing or returning those bubbles from their unstable positions back to their initial stable positions, as may be effected in various ways. One very simple, effective way is to progressively flex the card to "pop" the displaced bubbles back to undisplaced positions. Another way is to simply push the bubbles back, for example by pushers, or by air jets. Local heating may be used to relax the bubbles so that they self-displace back to initial position. The card may then be reused or stored. See Block 208.

Signals derived at 209, as by reading the displaced bubbles at 206, may be utilized as desired, as for example display on a CRT. See block 210.

Figure 12:
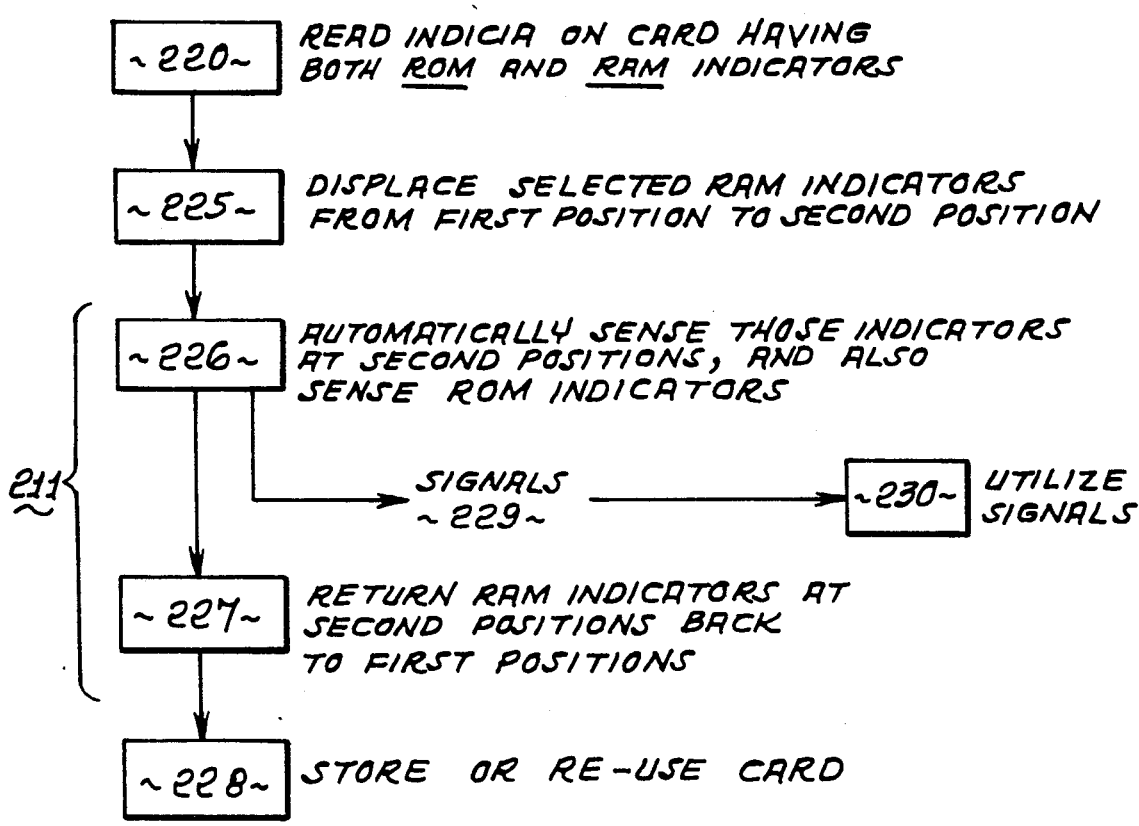

In FIG. 12, showing a somewhat modified functional block diagram, the blocks and associated numerals 220 and 225-231 correspond generally to blocks 200 and 205-210, as referred to. However, in FIG. 12, the term "bubbles" is generalized to also refer to other type indicators, as for example devices that are movable from a first or stable position to an unstable or second position, and then are returnable, as indicated at 227.

Figure 12A:
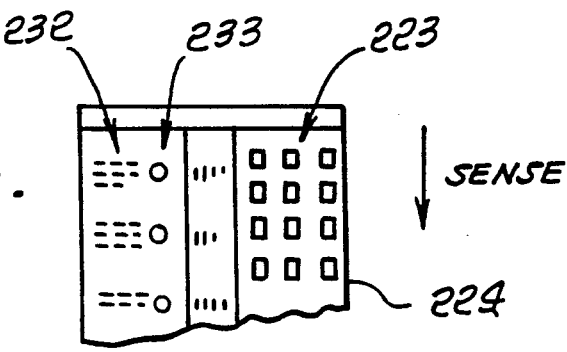

The displaceable indicators are seen at 223 on a card 224, in FIG. 12a. Such indicators have the characteristics of mechanical-type, random access memory, and therefore are labeled RAM indicators 223. Additional indicators on the card or sheet have the characteristics of mechanical-type, read only memory and are therefore labeled as ROM indicators 232 and 233. Indicators 232 for example may comprise BAR code on the card; and indicators 233 may for example comprise permanently displaced bubbles, or holes in the card. These have fixed positions correspond to information to be sensed or read whenever the card is read, and examples of such information are the name and address of the card owner or user, or other unchanging data. Block 226 indicates reading of all such RAM and ROM indicators; and block 227 indicates return of the selected RAM indicators back to initial position.

CARD EXAMPLE

The following is a description of an example of a card of the type 204 referred to above. It is also found in U.S. Pat. No. 4,812,630, and is reproduced herein for convenience of reference.

In the FIGS. 1-9, a card 10 is typically rectangular and has opposite faces 10a and 10b, and edges 11-14. As shown, the card is vertically elongated to bear multiple horizontal rows 15 of the indicia, in a column, as for example at least ten rows; it may have other forms and shapes. It may be foldable, and bendable, and it is peripherally sized to fit vertically in a shirt or pants pocket so that a customer may conveniently carry it to a store to obtain items or merchandise pre-selected on the card.

Figure 1:
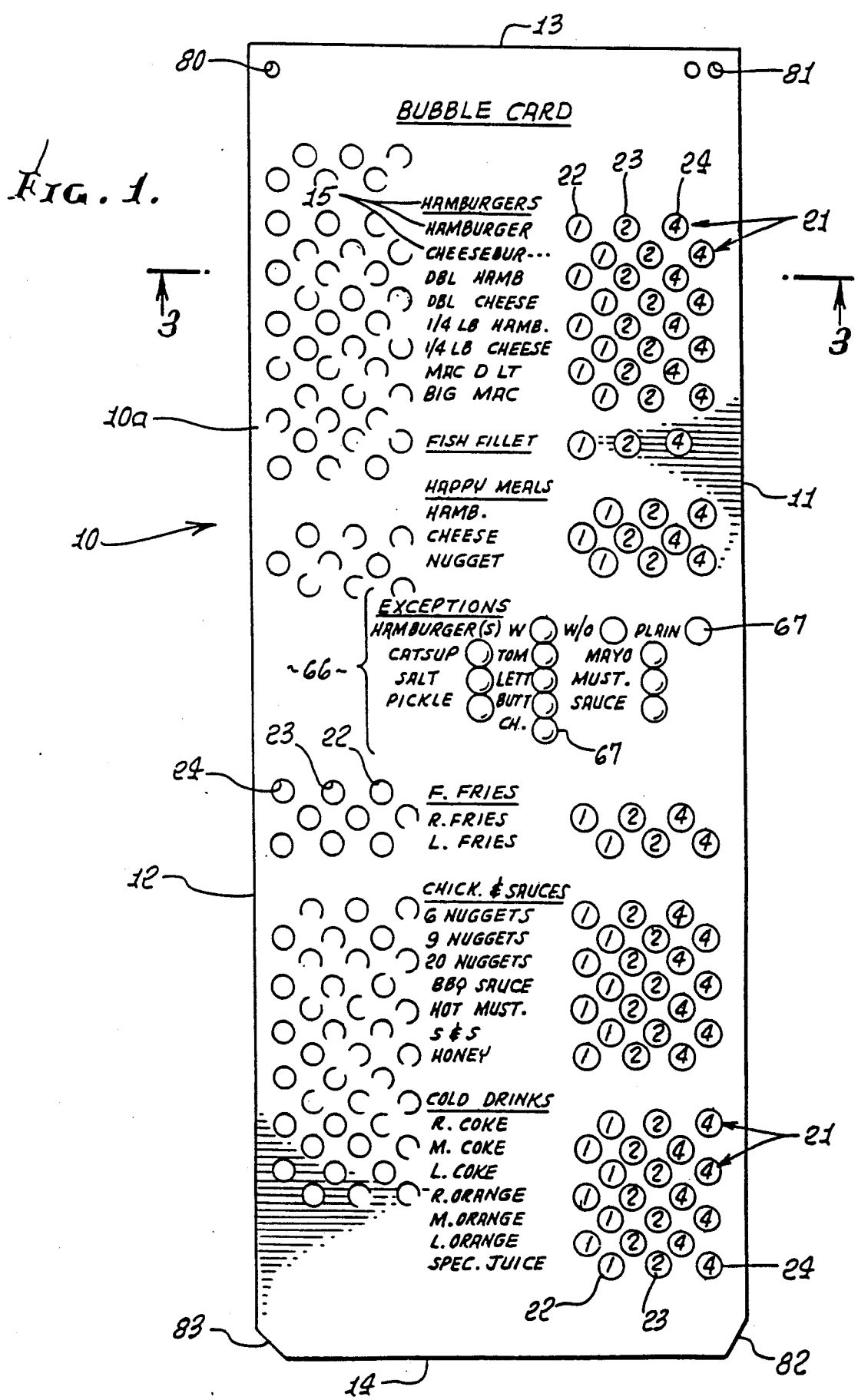
FIG. 1 is a plan view of a bubble card of the type to be processed according to the invention.
Figure 2:
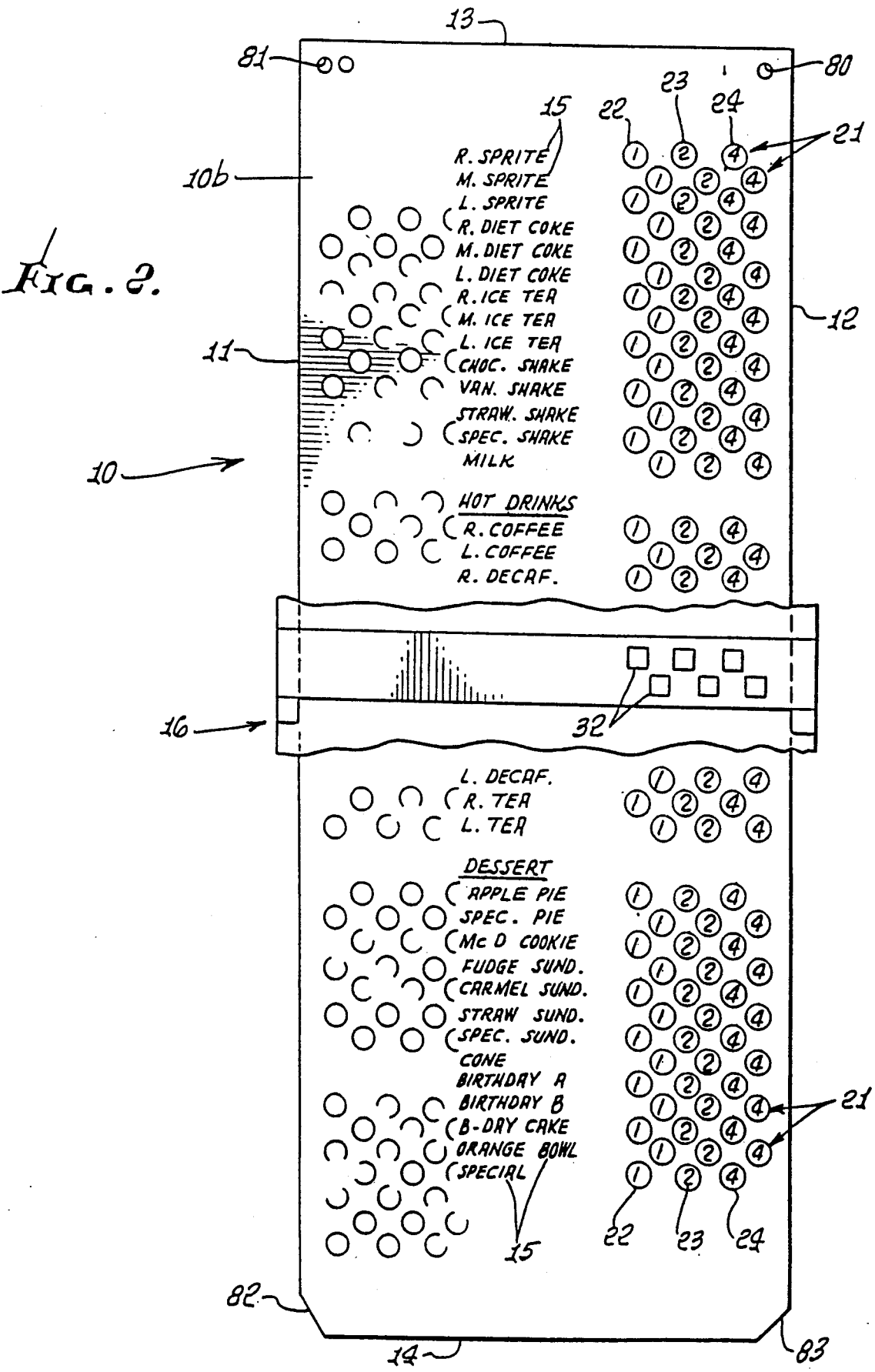
FIG. 2 is a plan view of the back side of the FIG. 1 card (or similar card), together with associated bubble sensor apparatus.

Each row of indicia typically indicates an item of merchandise to be selected by the bearer, and to be detected by a device 16 into which the card is removably receivable, as at the store, the latter for example being represented by a fast food take-out establishment. Thus, the items of merchandise to be selected may include fast food items, as are indicated in FIGS. 1 and 2; however, other items to be selected may appear on the card.

Further in accordance with the invention, rows 21 of bubbles are located on the card in horizontal alignment with the rows of indicia, the bubbles having positions on the card representative of numbers of items to be selected. Preferably there are at least three bubbles 22, 23 and 24 in each row, the three bubbles as shown representing the numbers 1, 2 and 4 of the same items, so that up to seven such items may be selected merely by manipulating one or more of the three bubbles.

As shown, a typical bubble 22 has a first stable position (see full lines in FIG. 4) projecting upwardly from the plane of the card, and a second stable position 22' into which it is displaced, relative to the plane of the card, by finger pressure, in order to indicate selection of an associated number or numbers of the selected items to be ordered. Thus, if a bubble 22 in the first column is displaced to position 22', one such items is to be ordered; if a bubble 23 in the second column is displaced to a position corresponding to 22', two such items are to be ordered; and if the bubble 24 in the third column is similarly displaced, four such items are to be ordered. The possible configurations are:

|  | Items to be Ordered |
| --- | --- |
| Displaced bubble 22 | 1 |
| Displaced bubble 23 | 2 |
| Displaced bubbles 22 and 23 | 3 |
| Displaced bubble 24 | 4 |
| Displaced bubbles 24 and 22 | 5 |
| Displaced bubbles 23 and 24 | 6 |
| Displaced bubbles 22, 23 & 24 | 7 |

Of advantage is the fact that the bubble may be returned to original (up) position, so that one can adjust and re-adjust his total order prior to presenting the card to the bubble "reader" (detector) at the store; and the card is therefore reusable after it has been "read" at the store, i.e, the user can take it with him for leisurely selection of items to be ordered, as at his home, followed by re-presentation to the card reader at the store for instant reading of the total order. Also, the store clerk can use the card for order filling checkout, i.e., as the items of merchandise or fast food are assembled on a counter, the corresponding displaced bubbles are returned to initial position by finger pressure on them at the reverse side of the card, where the bubbles project outwardly (from the plane of the card, at that reverse side). To assist in this process, the reverse side of the card may bear rows of indicia the same as or similar to the indicia on the front side of the card, so that the clerk can maintain the card in turned-over state and press the displaced bubbles at that reverse side while reading corresponding indicia on the reverse side, as the items are assembled.

The card may advantageously consist of plastic, such as polystyrene, so that the bubbles formed integrally with the card, as a one-piece unit, have flexible displaceability between two stable states, as described. In order that at least 10 rows of such bubbles and indicia can be assembled on a menu card, the bubbles typically have diameter "d" less than ⅜ inch, and such diameter should not be less than 3/16 inch to enable user finger displacement. Also, the bubbles should undergo displacement "t" between stable states, where "t" exceeds twice the card (and bubble) thickness. Card thickness is desirably between 0.003 and 0.009 inch, for desired card flexibility, and bubble displaceability between states.

FIGS. 2 and 5 show a card reader 16 defining a slot 30 into which a card is received during bubble reading or detecting. Proximity or other type detectors are shown at 32, to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms.

It will be noted that successive rows of bubbles in the column ar staggered. This allows greater vertical concentration of bubbles, while maintaining distances or gaps between the bubbles in successive rows, required by the reader.

Also, "1" bubbles can have one color, "2" bubbles another color, and "4" bubbles a third color to aid in bubble selection to correspond to numbers of items desired.

Referring again to FIG. 1, area 66 incorporates "exceptions" to the other items on the card, i.e., each listed item (catsup, etc.) in area 66 ha associated with it only one bubble, as at 67 for example, since only one order of that item is made. Such bubbles 67 are of the same configuration and operation as the bubbles described above.

With reference to FIG. 2, the rear side of the card shows a second column of bubbles 21, to the right of the additional rows of indicia 15, complementing those indicia shown in FIG. 1. Maximum use of space on the card is thereby made, by having the indicia in a central column on each side of the card, and bubbles in a column to the right of the indicia column. Staggering of bubbles, as shown, adds further to space utilization, since it enables vertical condensation of the indicia rows. To the left of the indicia column on each side appear the rear sides of the bubbles that are associated with indicia on the opposite side of the card. Staggering is not required.

Associated with corners of the cards are means (bevels, of different angularity, or holes) that are detectable by the sensor apparatus to orient the sensor circuitry to the card orientation, as inserted into the sensor. Thus, either end of the card may be inserted into the sensor and the card may face up or down. See holes 80 and 81, and beads 82 and 83.

In FIGS. 6–8, modified card 100 is typically rectangular and has opposite faces 100a and 100b, and edges 111–114. As shown, the card is vertically elongated to bear multiple horizontal rows 115 of indicia, in a column, as for example at least ten rows but it may have other forms and shapes. It may be foldable, and bendable, and it is peripherally sized to fit vertically in a shirt or pants pocket so that a customer may conveniently carry it to a store to obtain items of merchandise preselected on the card. The indicia are on thin labels 130 and 131 bonded to opposite sides of the card, the card typically being formed of transparent plastic material, which is flexible, and the thin labels, typically of paper, stiffen the card for ease and accuracy of handling and bubble selection.

Each row of indicia typically indicates an item of merchandise, and/or its size, to be selected by the bearer, and/or terms of payment, or other information regarding such items. See the representative items listed on the two labels, and in column sequence.

Further, in accordance with the invention, bubbles 121 are located n the card to the right of, and in horizontal alignment with the rows of indicia, the bubbles having positions on the card representative of items, or numbers of items to be selected. Two columns 180 and 181 bubbles are shown, the bubbles staggered, as illustrated.

A typical bubble 121' has a first stable position (as previously described for bubbles 22) projecting downwardly from the plane of the card, and a second and upward stable position into which it may be displaced, relative to the plane of the card, by finger pressure, in order to indicate selection of an item size or other associated date.

Of advantage is the fact that the bubble may be returned to original (down) position, so that one can adjust and re-adjust his total order prior to presenting the card to the bubble "reader" (detector), as at the store, or other location and the card is therefore reusable after it has been "read"; i.e., the user can take it with him for leisurely pre-selection of items to be ordered, as at his home, followed by representation to the card reader at the store for instant reading of the total order. Also, the store clerk can use the card for order filling checkout; i.e., as the items of merchandise or fast food are assembled on a counter, the corresponding displaced bubbles are retuned to initial position by finger pressure run along the reverse side of the card, where the bubbles project outwardly (from the plane of the card, at that reverse side). As the card section is run between the user's thumb (on the upper side), and first two fingers (on the lower side), the section flexes to an extent that bubbles are restored to first state. Thus, the device is an erasable, flexible, reprogrammable keyboard. The reverse side of the card may bear other rows of indicia as on label 131, and rows 182 and 183 of bubbles 121a (like bubbles in rows 180 and 181) are formed to the right of the indicia on label 131, in horizontal alignment with that indicia, as shown. Bubble manipulation is the same as described above.

The card transparent section or sections (forming the bubbles) may advantageously consist of polystyrene so that the bubbles formed integrally with the card, as a one-piece unit, have flexible displaceability between two stable states, as described.

The card sections 150 to the right of label 130 in FIG. 6, and 151 to the right of label 131 in FIG. 8, are transparent. In order that at least 10 rows of such bubbles and indicia can be assembled on a menu card, the bubbles typically have diameter "d" less than ⅜ inch, and such diameter should not be less than 3/16 inch to enable user finger displacement. Also, the bubbles should undergo displacement "t" between stable states, where "t" exceeds twice the card (and bubble) thickness. Card thickness is desirably between 0.003 and 0.009 inch, for desired card flexibility, and bubble displaceability between states.

The FIGS. 6–8 card may be read by the card reader 16 defining a slot 30 into which a card is received during bubble reading or detecting. Proximity or other type detectors are shown at 32, in FIGS. 2 and 7, to read the presence of displaced bubbles as the card travels endwise in the slot. Box 33 represents a circuit connected with the detectors 32 connected to convert the detector signals corresponding to displaced bubbles into other signals such as numbers on a display seen by the clerk to enable assembly of the correct numbers of selected items. The reader and detector can take many different forms.

FIG. 9 shows a selected bubble during reading, with parallel incident light rays 140 reflected convergently at 140a toward a reader sensor 142. The crests of the bubbles may be colored or darkened to enable the user to better view the bubbles during selection. See darkened "dots" 160.

FIG. 10 shows a non-selected bubble during reading, with parallel incident light rays 140 reflected divergently and therefore not sensed at a threshold level, by the sensor.

Associated with corners of the card of FIGS. 6–8 are means (bevels, of different angularity, or holes) that are detectable by the sensor apparatus to orient the sensor circuitry to the card orientation, as inserted into the sensor. Thus, either end of the card may be inserted into the sensor, and the card may face up or down. See bevels and 83.

Also provided is a means responsive to overcenter bubble displacement to visually quickly indicate the state of such displacement. Examples are:

(i) visible relative displacement of lines or dots, etc., on the bubble surface. See for example dots 210 inscribed on the bubble surface 211 in FIG. 4, and which separate further apart (210') in displaced bubble position 22';

(ii) a "checker" shaped design on the bubble surface that becomes warped due to bubble displacement;

(iii) a change in color or opacity of the bubble surface due to its displacement. Plastic materials are known, which produce this effect due to a change in stress in the plastic.

CARD READING AND DE-BUBBLING

Referring now to FIGS. 13–15, they show one example of an unusually simple and efficient apparatus operable upon a card, as described, for carrying out steps 206 and 207 in FIG. 9 (or steps 226 and 227 in FIG. 10, with respect to indicators in general). As will appear, such apparatus includes:

i) first means for detecting which of the bubbles are so displaced, and ii) second means to engage displaced bubbles and to urge them back toward the first positions after the first means detects which of the bubbles are displaced to second positions.

As shown, representative apparatus 249 includes a case or housing 250 having bottom, side and end walls 251–255. A cover 256 fits over the case and has top, side and end walls 257–61. See for example longitudinally extending upstanding tongue 262 on the upper rim of the case, and longitudinally extending, downwardly opening groove 263 on the cover, the tongue interfitting the groove to precisely align the cover and housing.

The housing has an end extension 264 carrying a downwardly and rearwardly sloping lip or lips 265; and the cover likewise has and end extension 266 carrying an upwardly and rearwardly sloping lip or lips 267. Such lips 265 and 267 define a tapering entrance zone or mouth 268 to receive endwise insertion of a card of the type or types referred to above. Card 204 is shown in FIG. 4 for purposes of illustration. A looping keeper or lock 269 fits over the lips as seen in FIG. 9.

As the card passes endwise through the apparatus 249, its opposite edges may travel along ledges or tracks 270 and 271, and 272 and 273, formed by the housing and cover, at laterally opposite inner sides of the apparatus. If the card passes unidirectionally through the apparatus, it is discharged at zone 274, formed between projecting extension 275 on the case end wall 254, and extension 276 on the cover end wall 260. A looping keeper or lock 277 fits over the extension, as see in FIG. 4.

Drive means to displace the card in the apparatus is shown to include a unit 280 that can be assembled into the housing 250. FIG. 14 shows unit 280 to include a U-shaped support 281 having upstanding flanges 282. Two longitudinally spaced drive rollers 283 and 284 are centrally carried by axles 285 and 286, the latter having opposite ends carried for rotation by bearings 287 at the ends of the axles and supported by the flanges, as shown. An electrical motor 288 is mounted between the flanges and drives the rollers 283 and 284. Note drive spur gear 290 on the motor shaft 291; driven spur gears 292 and 293 on the axles or shafts 285 and 286; and the transmission spur gears 294 and 295 meshing with gears 290 and 292, and with gears 290 and 293. Gears 294 and 295 are carried by shafts 296 and 297 supported by a flange 292. The arrangement is such that the card drive rollers 283 and 284 both rotate counterclockwise in FIG. 13 to engage the underside of the central longitudinally elongated zone 202 of the card 204. Upper idler rollers 310 and 311 engage the top of the card, above the rollers 283 and 284, to provide "pinch" for efficient positive drive of the card. Such rollers 310 and 311 are centrally carried by axles 312 and 313 whose ends are carried by bearing blocks 314 and 315 supported by cover 236. See FIG. 10.

The card is initially inserted manually between mouth or entrance 268 and the drive roller 283 at which point automatic roller driven advancement of the card at controlled rate occurs, in order that forcible "de-bubbling", i.e., return to initial stable state, from unstable displaced state, of the bubbles, may be efficiently effected, as will be explained further. The thin, plastic card, with certain bubbles displaced, is normally warped, and the de-bubbling process also serves to de-warp the plastic card.

As the card passes beyond the first drive roller 283, the displaced vs. undisplaced states of the bubble on card bubbles are sensed. See the sensor 300 in FIG. 13. Bar code on the card, as referred to in FIGS. 2 and 2a, is also read or sensed by sensor or sensors 301. Sensors 300 and 301 are electrically connected with processing circuitry on a "upper" PC board 304 seen in FIG. 14, and that fits in the cover; and other sensors 301a are electrically connected with processing circuitry on an "lower" PC board 302 that fits within the cover 256. See board positioning struts 320 and 321.

Referring back to the positive drive of the card by the driven rollers and pinch rollers, such drive serves to positively advance the card as against drag imposed by "de-bubbling" means associated with the apparatus. Such de-bubbling (displaced bubble return) means may take different forms; and the one shown is illustrative, but also highly efficient. It serves to locally and progressively flex the flexible plastic card, as it is advanced by the drive means, to thereby "snap" the bubbles from unstable positions back to initial stable positions.

See in this regard the longitudinally offset, rounded surfaces 326 and 327 which face in opposite vertical directions to respectively engage the undersurface and upper surface of the card zones that carry displaced or displaceable bubbles, as at 328 in FIG. 15. As the displaced bubbles 328 ride over the rounded surfaces 326 and 327 on projections 326a and 327a carried by the housing, they are forcibly returned back to stable, undisplaced positions, as seen at 328a. The rounded surface 327 on each projection 327a carried by the cover serves to deflect the card sufficiently so as to effect card flexing in passing 326 and 327, to result in "de-bubbling", as referred to. Note in FIG. 14 shows that there are two such projections 326a carrying surfaces 326, the projections mutually angled at angles α from lateral vertical plane passing through lines 330. Similarly, there are two downward projections 327a angled as are projections 326a. That angularity assures that a lateral row of displaced bubbles will not all be de-bubbled at once (imposing a heavy load on the drive unit); but rather, the bubbles in such a row will be progressively de-bubbled as the card moves longitudinally in the direction indicated by arrow 335 in FIG. 14. Thus, the projections extending toward opposite sides of the card are seen to have elongated edges angled relative to the card length and width dimensions such that displaced bubbles in a row will not all be similarly engaged by the elongated edges of a projection.

The drive means or unit 10 may be employed to drive a card forwardly to exit the apparatus at 340; or it may be reversed after a card has been "de-bubbled", to travel the card back to and through the entrance zone.

Where the card consists of plastic material, the bubbles in displaced state can take a "set", if not returned to original stable state within a determinable time limit. Therefore, the method of processing such a card includes returning the bubbles to stable state (i.e, subjecting it to the FIGS. 13 and 14 apparatus processing, for example), prior to the onset of plastic set.

If desired, the bubbles may have integral local ribbing to stiffen them. See U.S. Pat. No. 4,889,981 incorporated by reference herein.

FIG. 16 is like FIG. 4 and shows stable and unstable states (22 and 22') of a "half" bubble, on a thin, warpable card. Note that the "fixity" of the bubble at its equatorial region 300 inhibits full flexing to unstable state, whereby the detented bubble is less stable than the bubble in its natural, full line position.

FURTHER CONSIDERATIONS OF UTILITY

One typical card with bubbles, as referred to, has 40 rows of bubbles in four columns. Since each bubble can be in one of two states (stable and unstable), the number of possible unique combinations of the bubbles is $2^{160} = 1.5 \times 10^{48}$. If each particular combination of the bubbles equates to a specific state, then the card has the capability of addressing $1.5 \times 10^{48}$ unique bits of information.

Another possible combination of the bubbles is to make each row of four bubbles a word of 16 ($2^4$) combinations (or items); therefore, one can make forty selections (forty words) from a 16 item menu. Or, each two rows could consist of a "word" of eight bubbles, each of which could then yield twenty selections from a ($2^8$) 256 item menu.

In summary, using 160 bubbles, a person could make one selection from a population of $1.5 \times 10^{48}$ items, or, at the other extreme, a person could make 160 selections from a population of 160.

Combined such a two-state, bubble populated card with sets of bar codes attached the card, as referred to above, allows a card to have an infinite number of data selection possibilities for readout, as by the method and means referred to.

I claim:
1. Apparatus for processing a menu device comprising
   a) a card,
   b) bubbles on said card having positions corresponding to selectable data, at least some of the bubbles extending in a row,
   c) each bubble having a first position projecting upwardly from said plane of said card, and a second position into which it is displaced relative to said plane of the card, by finger pressure, to indicate selection of data corresponding to bubble position on said card, said apparatus comprising:
   d) first means for detecting which of said bubbles are so displaced, and
   e) second means to engage displaced bubbles and to urge them back toward said first positions after the first means detects which of the bubbles are displaced to second positions,
   f) and means receiving the card for driving the card bodily edgewise in a card travel direction so that all bubbles on the card pass relatively over said second means which causes progressive flexing and unflexing of the card proximate said second means as the card progresses edgewise in response to said driving, said second means including multiple projections extending toward opposite sides of the card and having card engaging elongated edges angled relative to the card length and width dimension such that displaced bubbles in a row will not all be similarly engaged by the elongated edge of a projection.

2. The apparatus of claim 1 wherein said apparatus forms a card flexing zone or zones into which the card and bubbles thereon are removably received, said card received in said zone or zones.

3. The apparatus of claim 2 wherein there are at least 10 rows of bubbles on the card and of one-piece construction therewith.

4. The apparatus of claim 3 wherein the card and bubbles consists of plastic material.

5. The apparatus of claim 2 wherein the card consists of synthetic resinous material, and is warped in response to bubble displacement to said second position.

6. The apparatus of claim 1 wherein the bubbles are arranged in rows and columns on the card, the apparatus including drive means oriented to drive the card in a direction parallel to said columns, the card engageable by the drive means along a path free of bubbles.

7. The apparatus of claim 6 wherein the bubbles in successive rows are staggered.

8. The apparatus of claim 6 wherein said drive means includes at least one drive roller engageable with the card along a surface thereof free of said bubbles, and having means carrying said drive means and having a card entrance zone, said first means positioned to detect which of the bubbles are so displaced at locations between said entrance zone and card drive roller.

9. The apparatus of claim 1 wherein the bubbles are unitary with the card.

10. The apparatus of claim 9 wherein the bubbles have substantially the same diameter, which is less than about ¼ inch.

11. The apparatus of claim 9 wherein the bubbles have diameters between 3/16 and ⅜ inch.

12. The apparatus of claim 9 wherein the bubbles have thickness of between 0.003 and 0.008 inch.

13. The combination of claim 1 wherein the card also has fixed, detectable information means thereon.

14. The combination of claim 13 wherein said fixed detectable information means on the card includes at least one of the following:
  i) BAR code
  ii) holes
  iii) bubbles that are permanently displaced.

15. The apparatus of claim 1 wherein said bubbles have integral local ribbing acting to stiffen the displaced bubbles for resisting return thereof to said first position.

16. The method of claim 1 wherein the card consists of thick flexible, plastic material characterized in that leaving the bubbles in deflected, unstable state beyond a determinable time interval results in such deflected bubbles taking a permanent set.

* * * * *